(12) United States Patent
Jung

(10) Patent No.: US 11,338,782 B2
(45) Date of Patent: May 24, 2022

(54) BRAKE SYSTEM AND METHOD FOR CONTROLLING THE SAME

(71) Applicant: MANDO CORPORATION, Gyeonggi-do (KR)

(72) Inventor: Sam Hyun Jung, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 507 days.

(21) Appl. No.: 16/400,014

(22) Filed: Apr. 30, 2019

(65) Prior Publication Data

US 2019/0337498 A1 Nov. 7, 2019

(30) Foreign Application Priority Data

May 2, 2018 (KR) .................. 10-2018-0050655

(51) Int. Cl.
| | |
|---|---|
| B60T 7/12 | (2006.01) |
| B60T 8/1761 | (2006.01) |
| B60T 8/32 | (2006.01) |
| B60T 17/18 | (2006.01) |
| B60T 13/74 | (2006.01) |

(52) U.S. Cl.
CPC .............. B60T 8/1761 (2013.01); B60T 8/32 (2013.01); B60T 13/74 (2013.01); B60T 17/18 (2013.01)

(58) Field of Classification Search
CPC .......... B60T 8/1761; B60T 8/32; B60T 17/18; B60T 13/74; B60T 2201/03; B60T 8/326; B60T 2210/10; B60T 13/662; B60T 17/221; B60T 13/745; B60T 17/22; B60T 13/66; B60T 8/171; B60T 8/172; B60T 7/12; F16D 2066/001; B60Y 2400/81

USPC ........................................................ 701/78
See application file for complete search history.

(56) References Cited

U.S. PATENT DOCUMENTS

| | | | | |
|---|---|---|---|---|
| 10,457,261 | B2 * | 10/2019 | Jeon ...................... | B60T 13/142 |
| 10,583,819 | B2 * | 3/2020 | Kim ...................... | B60T 13/146 |
| 10,752,227 | B2 * | 8/2020 | Jung ..................... | B60T 13/686 |
| 2015/0152861 | A1 * | 6/2015 | Stoner .................. | G01M 17/00 73/168 |
| 2016/0009267 | A1 * | 1/2016 | Lesinski, Jr. ........... | B60T 7/12 303/10 |
| 2017/0274882 | A1 * | 9/2017 | Onodera ............... | B60T 13/662 |
| 2018/0065611 | A1 * | 3/2018 | Matsuura ............... | B60L 7/26 |
| 2018/0229707 | A1 * | 8/2018 | Son ....................... | B60T 13/686 |
| 2018/0312154 | A1 * | 11/2018 | Yen ...................... | B60T 17/225 |

FOREIGN PATENT DOCUMENTS

| | | |
|---|---|---|
| JP | 2009-166733 | 7/2009 |
| JP | 2013-010372 | 1/2013 |
| JP | 5321885 | 10/2013 |

* cited by examiner

*Primary Examiner* — Shardul D Patel
(74) *Attorney, Agent, or Firm* — Ladas & Parry, LLP

(57) ABSTRACT

A brake system includes a piston configured to generate hydraulic pressure of brake fluid stored in a brake system, and an electronic control unit (ECU) configured to calculate hydraulic pressure to be generated in response to an amount of movement of the piston. The ECU estimates a current temperature of the brake fluid, calculates a maximum estimated hydraulic pressure of the piston based on the estimated current temperature, and determines a maximum hydraulic-pressure reference value for backward movement control of the piston based on the maximum estimated hydraulic pressure.

19 Claims, 6 Drawing Sheets

BRAKE SYSTEM AND METHOD FOR CONTROLLING THE SAME

CROSS-REFERENCE TO RELATED APPLICATION

This application is based on and claims priority under 35 U.S.C. § 119 to Korean Patent Application No. 10-2018-0050655, filed on May 2, 2018 in the Korean Intellectual Property Office, the disclosure of which is incorporated by reference in its entirety.

BACKGROUND

1. Field

Embodiments of the present disclosure relate to a brake system and a method for controlling the same.

2. Description of the Related Art

A brake system for braking of a vehicle is essentially mounted to the vehicle, and various systems have recently been proposed to obtain stronger and more stable braking force.

Generally, a brake system includes a hydraulic-pressure supply device. Once a driver depresses a brake pedal, the hydraulic-pressure supply device senses displacement of the pedal through a pedal displacement sensor, and receives an electrical signal indicating the driver's braking intention from the pedal displacement sensor, such that pressure of brake fluid (i.e., brake oil) is supplied to wheel cylinders.

However, brake pressure received from the hydraulic-pressure supply device increases in proportion to the increasing volume of brake fluid supplied to calipers, and a brake-pressure increase rate relative to the amount of consumed brake fluid may depend on temperature of the brake fluid.

In addition, if sudden deceleration control of a vehicle is needed, the conventional brake system performs anti-lock brake system (ABS) control. If brake pressure reaches a maximum pressure, a piston for generating hydraulic pressure in the brake system moves backward. In this case, an increase rate of brake pressure relative to the amount of movement of the piston is changed according to temperature of brake fluid, such that brake pressure of the conventional brake system does not reach a maximum pressurization pressure. As a result, the conventional brake system has difficulty in easily performing ABS control.

SUMMARY

Therefore, It is an aspect of the present disclosure to provide a brake system for determining when a piston begins to move backward by referring to temperature of brake fluid so as to easily perform sudden deceleration control of a vehicle, and a method for controlling the same.

Additional aspects of the invention will be set forth in part in the description which follows and, in part, will be obvious from the description, or may be learned by practice of the invention.

In accordance with an aspect of the present disclosure, a brake system includes a piston configured to generate a hydraulic pressure of brake fluid stored in a brake system, and an electronic control unit (ECU) configured to calculate a hydraulic pressure to be generated in response to an amount of movement of the piston. The electronic control unit (ECU) estimates a current temperature of the brake fluid, calculates a maximum estimated hydraulic pressure of the piston based on the estimated current temperature, and determines a maximum hydraulic-pressure reference value for backward movement control of the piston based on the maximum estimated hydraulic pressure.

The electronic control unit (ECU) may correct a first function based on the current temperature, and may calculate a maximum estimated hydraulic pressure of the piston having moved to a maximum limit value based on the corrected first function.

When the maximum estimated hydraulic pressure is less than a pre-stored maximum hydraulic-pressure reference value, the electronic control unit (ECU) may reduce the maximum hydraulic-pressure reference value.

The brake system may further include a sensor module configured to measure the hydraulic pressure, whereby the hydraulic pressure measured by the sensor module reaches the maximum hydraulic-pressure reference value in a situation in which sudden deceleration control is required, the electronic control unit (ECU) moves the piston backward.

The electronic control unit (ECU) may correct the first function in a manner that, as the temperature of the brake fluid increases, a change value of the hydraulic pressure relative to a volume change in the brake fluid decreases.

When the temperature of the brake fluid is equal to or higher than a predetermined high-temperature reference value, the electronic control unit (ECU) may correct the first function to a pre-stored second function. When the temperature of the brake fluid is less than a predetermined low-temperature reference value, the electronic control unit (ECU) may correct the first function to a pre-stored third function.

In accordance with another aspect of the present disclosure, a method for controlling a brake system in which a first function for calculating hydraulic pressure to be generated in response to volume of brake fluid to be consumed in the brake system is pre-stored includes estimating a temperature of the brake fluid, measuring a hydraulic pressure of the brake fluid, calculating a maximum estimated hydraulic pressure of a piston based on the estimated temperature, determining a maximum hydraulic-pressure reference value for controlling backward movement of the piston based on the maximum estimated hydraulic-pressure, and when the measured hydraulic pressure reaches the maximum hydraulic-pressure reference value in a situation in which sudden deceleration control is required, moving the piston backward.

The determining the maximum hydraulic-pressure reference value for controlling backward movement of the piston based on the maximum estimated hydraulic pressure may include, when the maximum estimated hydraulic pressure is less than a pre-stored maximum hydraulic-pressure reference value, reducing the maximum hydraulic-pressure reference value.

The correcting the first function based on the temperature may include correcting the first function in a manner that, as the temperature of the brake fluid increases, a change value of the hydraulic pressure relative to a volume change in the brake fluid decreases.

The correcting the first function based on the temperature may include, when the temperature of the brake fluid is equal to or higher than a predetermined high-temperature reference value, correcting the first function to a pre-stored second function, and when the temperature of the brake fluid is less than a predetermined low-temperature reference value, correcting the first function to a pre-stored third function.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
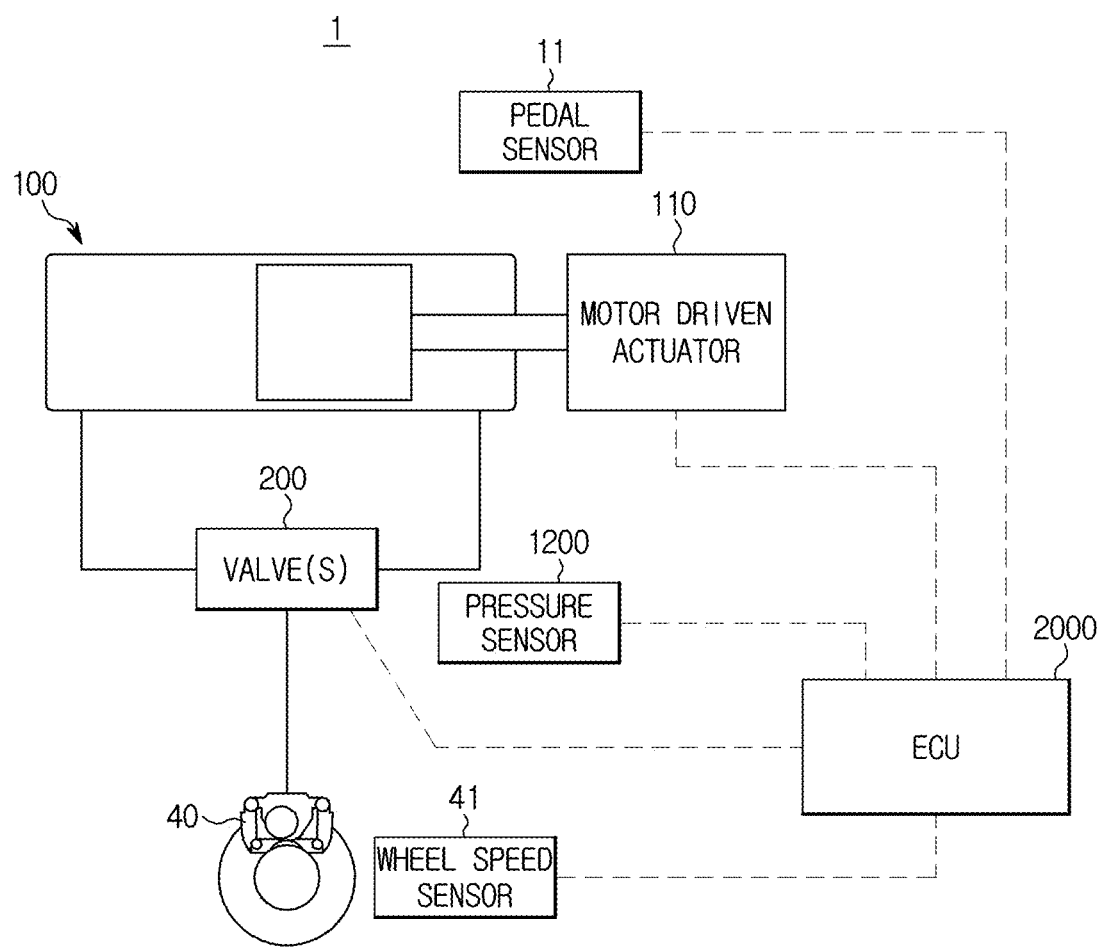
FIG. 1 is a block diagram illustrating a brake system according to an embodiment of the present disclosure.

Reference will now be made in detail to the embodiments of the present disclosure, examples of which are illustrated in the accompanying drawings, wherein like reference numerals refer to like elements throughout. It should be noted that the specification of the present disclosure does not describe all the constituent elements of the embodiments, and general matters well known to those skilled in the art and redundant matters of the embodiments will not be described herein for clarity.

Throughout the specification of the present disclosure, terms "... part", "... module", "... member", "... block", and the like mean an element capable of being implemented by hardware, software, or a combination thereof. As used in the specification and appended claims, the term " . . . parts", " . . . modules", " . . . members", or " . . . blocks" may be implemented by a single constituent element, or the term " . . . part", " . . . module", " . . . member", or " . . . block" may include a plurality of constituent elements.

Throughout the specification of the present disclosure, if it is assumed that a certain part includes a certain component, the term "comprising or including" means that a corresponding component may further include other components unless context clearly indicates otherwise.

In description of the present disclosure, the terms "first" and "second" may be used to describe various components, but the components are not limited by the terms. These terms may be used to distinguish one component from another component. For example, a first component may be called a second component and a second component may be called a first component without departing from the scope of the present disclosure. The term "and/or" may include a combination of a plurality of items or any one of a plurality of items.

The terms "a", "an", "one", "the" and other similar terms include both singular and plural forms, unless context clearly dictates otherwise.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The embodiments of the present disclosure will hereinafter be given with reference to the attached drawings.

FIG. 1 is a block diagram illustrating a brake system 1 according to an embodiment of the present disclosure.

Referring to FIG. 1, a brake system 1 may generally include a master cylinder (not shown) configured to generate hydraulic pressure, a reservoir (not shown) connected to an upper part of the master cylinder so as to store oil therein, an input rod (not shown) configured to pressurize the master cylinder in response to a pedal effort applied to a brake pedal, wheel cylinders (not shown) configured to brake individual wheels RR, RL, FR, and FL upon receiving the hydraulic pressure, and a pedal sensor 11 configured to sense displacement of the brake pedal.

The brake system 1 according to one embodiment of the present disclosure may include a hydraulic-pressure supply device 100 and at least one valve 200. The hydraulic-pressure supply device 100 may mechanically operate by receiving an electrical signal indicating the driver's braking intention from the pedal sensor 11. The valves 200 may receive hydraulic pressure from the hydraulic-pressure supply device 100, and may thus control flow of the received hydraulic pressure, such that the resultant hydraulic pressure may be transferred from a hydraulic circuit composed of the valves 200 to wheel cylinders 40 mounted to at least one wheel.

In this case, the valves 200 may be used as constituent elements of the hydraulic circuit, and may include different types of valves as necessary.

That is, an electronic control unit (ECU) 2000 may control not only the hydraulic-pressure supply device 100, but also the valves 200 constructing the hydraulic circuit based on hydraulic pressure information and pedal displacement information.

The hydraulic-pressure supply device 100 may supply oil pressure to wheel cylinders 40. The hydraulic-pressure supply device 100 may be constructed in various ways. For example, a motor driven actuator 110 may allow oil stored in a chamber to be discharged by the piston (not shown) configured to operate by driving force of a motor (not shown), such that hydraulic pressure can be transferred to the wheel cylinders 30. Alternatively, the hydraulic-pressure supply device 100 may also be implemented as a pump driven by the motor or as a high-pressure accumulator.

More particularly, since displacement of the brake pedal is changed by the driver who depresses the brake pedal, the pedal sensor 11 may output an electrical signal, such that the motor may operate by this electrical signal.

That is, the motor driven actuator 110 may refer to a device configured to generate rotational force by receiving an output signal from the ECU 2000, and may generate such rotational force in a forward or backward direction.

In addition, a motor position sensor (MPS) may refer to a motor control sensor configured to control a rotation angle of the motor or a current of the motor.

In other words, a signal sensed by the pedal sensor 11 as soon as displacement occurs in the brake pedal may be transmitted to the ECU 2000, and the ECU 2000 may drive the motor in one direction, such that a hydraulic piston of the hydraulic-pressure supply device 100 moves forward, resulting in occurrence of hydraulic pressure.

In contrast, when a driver takes a foot off the brake pedal such that a pedal effort is removed from the brake pedal, the ECU 200 may drive the motor in an opposite direction to the one direction, such that the motor rotates in the opposite direction. As a result, the hydraulic piston of the hydraulic-pressure supply device 100 moves back to an original position thereof (i.e., the hydraulic piston of the hydraulic-pressure supply device 100 moves backward), resulting in occurrence of negative pressure.

Meanwhile, hydraulic pressure and negative pressure may also occur in opposite directions to the above-mentioned directions.

As described above, the hydraulic-pressure supply device 100 may transmit hydraulic pressure to the wheel cylinders 40 according to the rotation direction of rotational force generated from the motor driven actuator 110, or may suction such hydraulic pressure according to the rotation direction of rotational force generated from the motor driven actuator 110, such that the resultant hydraulic pressure can be transmitted to a reservoir.

A hydraulic control unit may receive hydraulic pressure, and may transmit the received hydraulic pressure to at least one wheel. For example, the hydraulic control unit 200 may include two hydraulic circuits, i.e., a first hydraulic circuit and a second hydraulic circuit. The first hydraulic circuit may control the front right wheel FR and the rear left wheel (RL), and the second hydraulic circuit may control the front left wheel FL and the rear right wheel RR. The wheel cylinders 40 may be respectively mounted in the four wheels FR, FL, RR, and RL, such that hydraulic pressure is supplied to the wheel cylinders 40, resulting in braking of the respective wheels FR, FL, RR, and RL.

The hydraulic control unit may include inlet valves (not shown) provided at front ends of the respective wheel cylinders 40 to control flow of hydraulic pressure, and outlet valves (not shown) connected to the reservoir 20 while being respectively branched from any point between the inlet valves and the wheel cylinders 40.

Operations of the brake system 1 according to the embodiment of the present disclosure will hereinafter be described in detail.

The brake system 1 may control the hydraulic-pressure supply device 100 shown in FIG. 1 and a plurality of valves contained in the hydraulic control unit. The brake system 1 may include a sensor module and the ECU 2000. The sensor module may include the motor position sensor (MPS), the pedal sensor 11, etc. as shown in FIG. 1. The ECU 200 may control the brake system 1 based on a sense signal acquired from the sensor module.

In more detail, the sensor module 1000 may include the pedal sensor 11, a wheel speed sensor, and a pressure sensor 1200.

The wheel speed sensor may be disposed in each of the four wheels FL, RR, RL and FR, such that the wheel speed sensor may transmit wheel speed measured at each wheel to the ECU 2000.

The pressure sensor 1200 may be configured to measure oil pressure or hydraulic pressure in the brake system 1, and may include a plurality of pressure sensors.

Therefore, the brake system 1 according to the embodiment of the present disclosure may estimate temperature of brake fluid (i.e., brake oil) not only using a wheel speed measured by the wheel speed sensor, but also using a pressure value measured by the pressure sensor 1200.

In more detail, it is possible for the brake system 1 to calculate temperature of brake fluid based on speed of each wheel and friction and pressure values generated from each wheel. In this case, the process for calculating the temperature of the brake fluid may be carried out by the ECU 2000.

In more detail, the brake system 1 may measure pressure values of respective wheels using pressure sensors respectively installed in the four wheels FR, FL, RR, and RL, and may transmit the measured pressure values to the ECU 2000.

Reference numeral 'PS1' not illustrated in FIG. 1 is a hydraulic-passage pressure sensor to sense pressure of a hydraulic circuit, and reference numeral 'PS2' not illustrated in FIG. 1 is a backup-passage pressure sensor to measure oil pressure of the master cylinder 20.

Subsequently, the ECU 2000 may serve to overall control the brake system 1 of the vehicle. The ECU 2000 may estimate hydraulic pressure based on sensor values measured by various sensors, and may determine whether there is an abnormal or faulty sensor in the various sensors based on the estimated hydraulic pressure. In addition, the ECU 2000 may include a memory to store various kinds of data needed to perform the above-mentioned operations.

Figure 2:
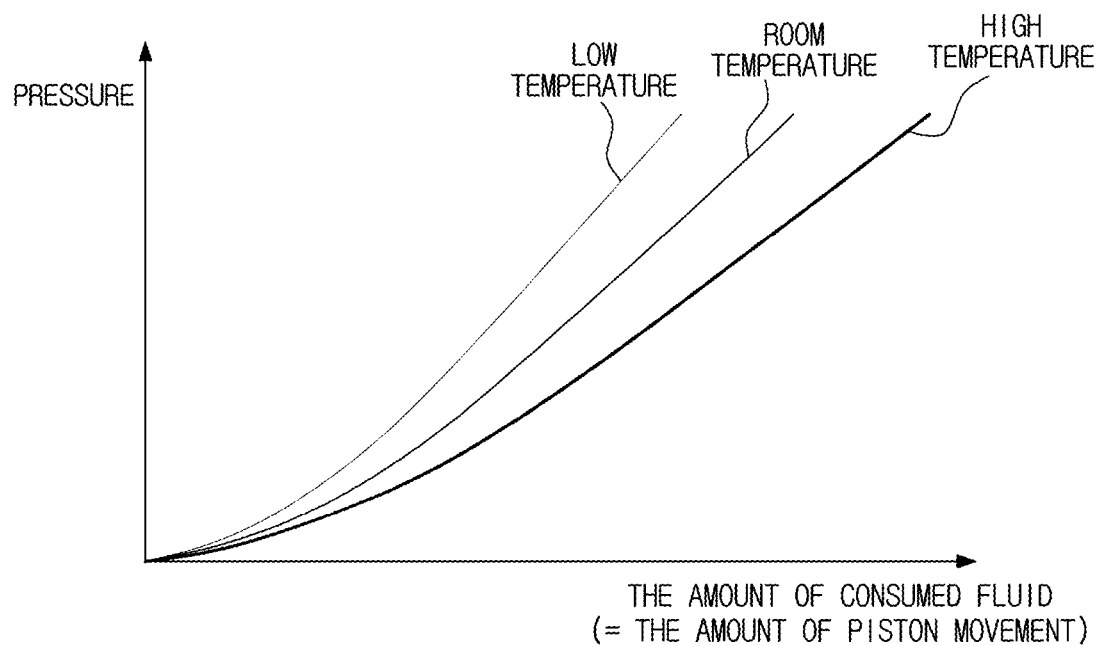
FIG. 2 is a graph illustrating characteristics of the amount of fluid consumed in the brake system according to an embodiment of the present disclosure.
Figure 3:
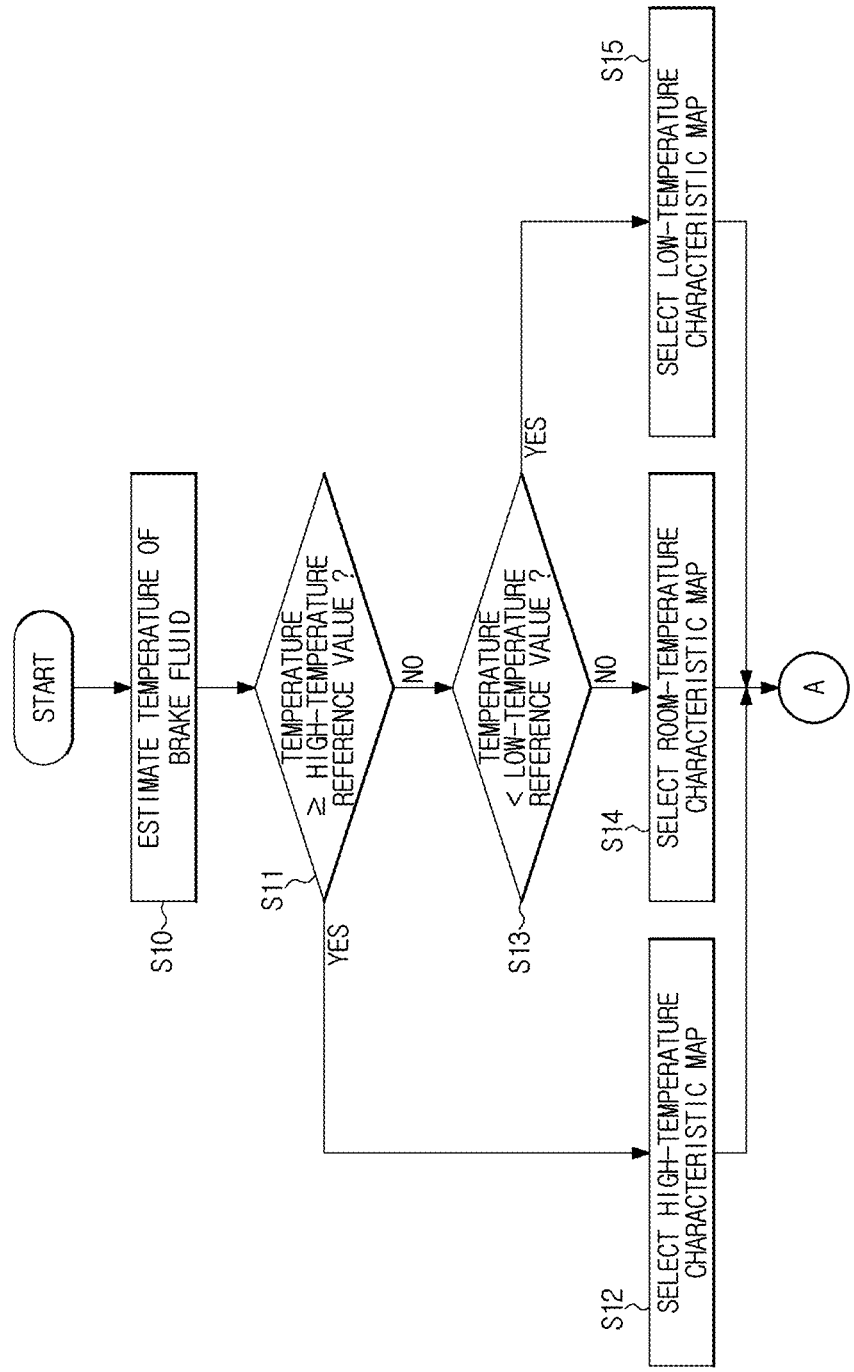
FIG. 3 is a flowchart illustrating a method for controlling a brake system according to an embodiment of the present disclosure.

Detailed operations of the brake system 1 according to the embodiment of the present disclosure will hereinafter be described with reference to FIGS. 2 and 3. FIG. 2 is a graph illustrating characteristics of the amount of fluid consumed in the brake system 1 according to the embodiment of the present disclosure. FIG. 3 is a flowchart illustrating a method for controlling the brake system 1 according to the embodiment of the present disclosure.

Referring to FIG. 2, a curve of the amount of consumed fluid (oil) to hydraulic pressure (hereinafter referred to as "a consumed-fluid-amount/hydraulic-pressure curve") may allow a processor (not shown) to calculate hydraulic pressure that is generated in response to volume of the amount of fluid (i.e., volume of consumed brake fluid shown in a horizontal axis of FIG. 2) flowing into calipers (not shown) of respective wheels, such that the processor may calculate brake pressure to be generated in each caliper (as shown in a vertical axis of FIG. 2) using the consumed-fluid-amount/hydraulic-pressure curve. The consumed-fluid-amount/hydraulic-pressure curve may be a prescribed function to be used to calculate hydraulic pressure to be generated in response to volume of fluid flowing into each caliper. The consumed-fluid-amount/hydraulic-pressure curve may also be a brake pressure curve illustrating brake pressure to be applied to the brake pedal according to volume of the amount of fluid.

In this case, as the piston of each cylinder moves farther forward (i.e., as the piston of each cylinder pushes (pressurizes) brake fluid), the horizontal axis of FIG. 2 may also indicate the amount of movement of the piston. Meanwhile, the consumed-fluid-amount/hydraulic-pressure curve may have different characteristics according to temperature of brake fluid. As temperature of the brake fluid gradually increases, the amount of lost hydraulic pressure may also increase, such that a change value of hydraulic pressure affected by change in volume of the amount of fluid flowing into calipers may be reduced.

Therefore, the processor of the brake system 1 according to the embodiment of the present disclosure may correct the prestored consumed-fluid-amount/hydraulic-pressure curve based on temperature of the brake fluid.

Referring to FIG. 3, the processor may estimate temperature of brake fluid (S10). Although the above-mentioned operation for estimating such temperature of the brake fluid may be carried out based on a speed value received from the wheel speed sensor 41 and a pressure value received from the pressure sensor, the scope or spirit of the present disclosure is not limited thereto. If the brake system 1 further includes a separate temperature sensor, the brake system 1 may estimate a temperature of the brake fluid based on an output value of the separate temperature sensor.

The estimated temperature of the brake fluid may be proportional to the speed value received from the wheel speed sensor 41 and the pressure value received from the pressure sensor 1200.

Subsequently, the processor may compare the estimated temperature of the brake fluid with a range of a reference temperature value (S11, S13). The reference temperature value range may include information about a high-temperature reference value and information about a low-temperature reference value.

In more detail, if the estimated temperature of the brake fluid is equal to or higher than the high-temperature reference value (YES in S11), the processor may allow the graph of the amount of consumed fluid to hydraulic pressure (i.e., the consumed-fluid-amount/hydraulic-pressure curve) to have a gentle upward curve. For example, the processor may select a high-temperature characteristic curve (cur1) pre-stored in the memory (S12). If the high-temperature characteristic curve (cur1) is selected, the processor may determine that a hydraulic-pressure change value to be affected by a volume change of the amount of fluid is lower than those of a room-temperature characteristic curve (cur2).

In contrast, when the estimated temperature of the brake fluid is less than the high-temperature reference value (NO in S11) and is equal to or higher than the low-temperature reference value (NO in S13), the processor may control the consumed-fluid-amount/hydraulic-pressure curve to remain unchanged. For example, the processor 2100 may select the room-temperature characteristic curve (cur2) pre-stored in the memory (S14). If the room-temperature characteristic curve (cur2) is selected, the processor may determine that a hydraulic-pressure change value to be affected by a volume change of the amount of fluid is higher than those of the high-temperature characteristic curve (cur1) and is less than those of the low-temperature characteristic curve (cur3).

However, if the estimated temperature of the brake fluid is less than the low-temperature reference value (YES in S13), the processor may allow the graph of the amount of consumed fluid to hydraulic pressure (i.e., the consumed-fluid-amount/hydraulic-pressure curve) to have a steep upward curve. For example, the processor may select the low-temperature characteristic curve (cur3) pre-stored in the memory (S15). If the low-temperature characteristic curve (cur3) is selected, the processor may determine that a hydraulic-pressure change value to be affected by a volume change of the amount of fluid is higher than those of the room-temperature characteristic curve (cur2).

Meanwhile, if the processor corrects the consumed-fluid-amount/hydraulic-pressure curve by selecting any one of the high-temperature characteristic curve (cur1), the room-temperature characteristic curve (cur2), and the low-temperature characteristic curve (cur3), the processor may determine whether leakage of brake fluid occurs based on the corrected consumed-fluid-amount/hydraulic-pressure curve (cur1, cur2, or cur3).

Figure 4:
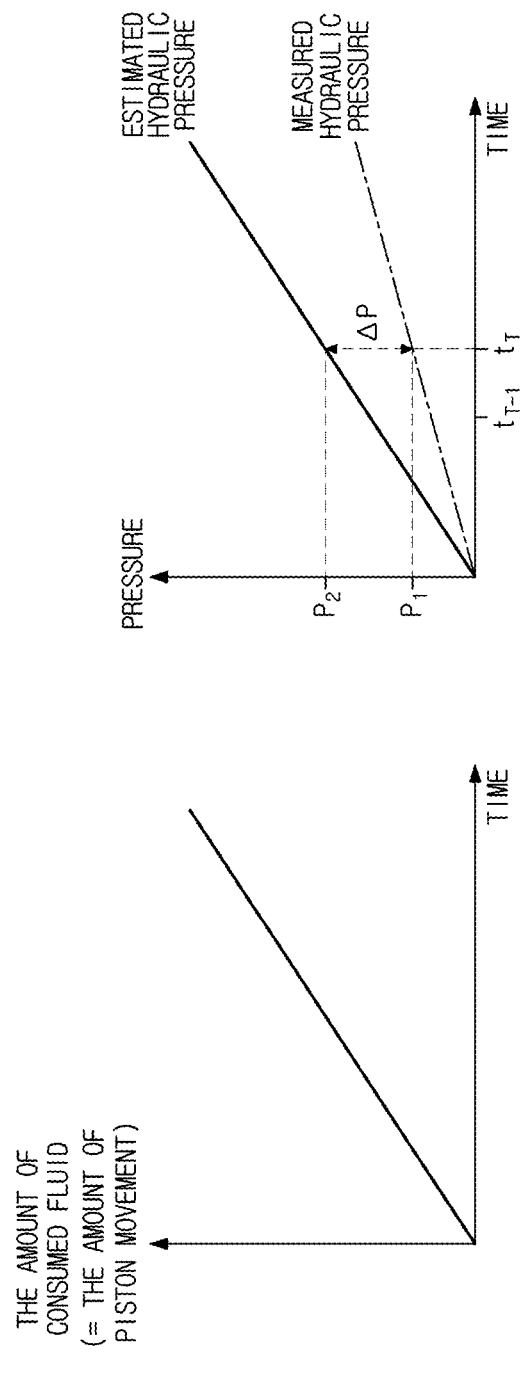
FIG. 4 is a first graph illustrating that volume of the amount of fluid flowing into calipers of individual wheels is changed with time, as well as a second graph illustrating hydraulic pressure changed with time.

FIG. 4 is a first graph illustrating that volume of the amount of fluid flowing into calipers of individual wheels is changed with time, as well as a second graph illustrating hydraulic pressure changed with time.

Referring to FIG. 4, volume of the amount of fluid (i.e., the amount of piston movement) flowing into calipers of respective wheels may increase in proportion to a pedal effort applied to the brake pedal. If it is assumed that a constant pedal effort is applied to the brake pedal by the driver who depresses the brake pedal, the amount of brake fluid to be consumed with time may increase steadily as shown in the left part of FIG. 5. The above-mentioned curve illustrating the amount of brake fluid to be consumed with time (hereinafter referred to as "time/consumed-fluid-amount curve") may be used by the processor that calculates hydraulic pressure to be generated according to volume of the amount of fluid flowing into the calipers, and may be a pre-stored function to be used for calculating such hydraulic pressure to be generated according to volume of the amount of fluid.

Meanwhile, the processor of the brake system 1 according to one embodiment of the present disclosure may determine whether leakage of brake fluid occurs by referring to the corrected curve of the amount of consumed fluid to hydraulic pressure, and may perform a series of operations needed to perform ABS (Anti-lock Brake System) control for sudden deceleration control by also referring to the corrected curve of the amount of consumed fluid to hydraulic pressure.

Figure 5:
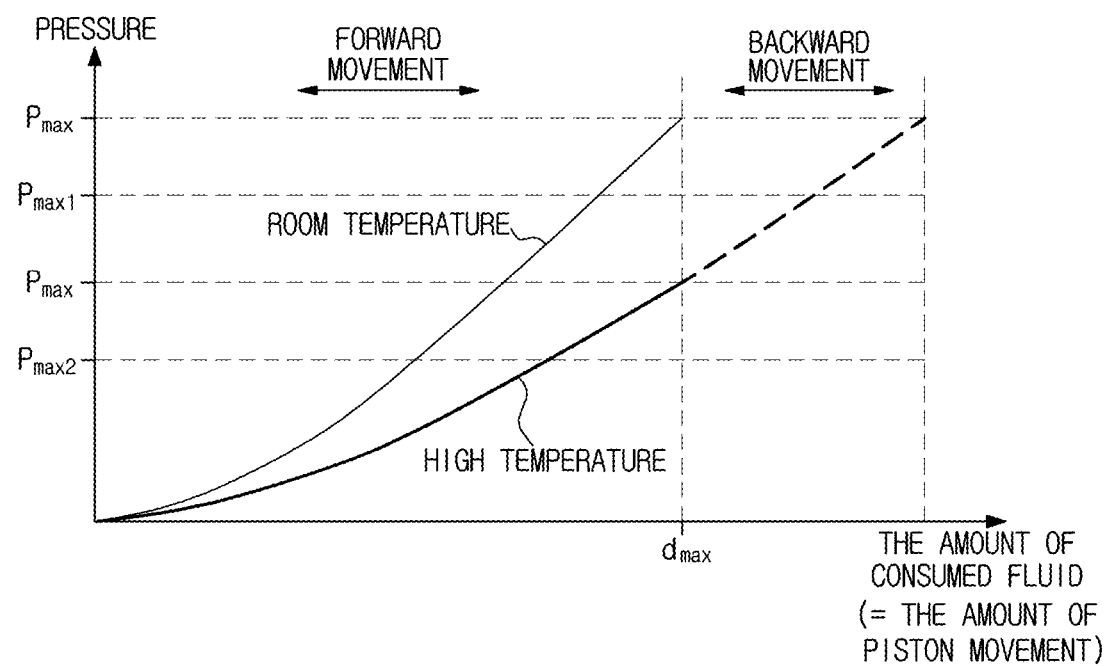
FIG. 5 is a graph illustrating curves of the amount of consumed fluid to hydraulic pressure depending on the amount of forward or backward movement of a piston.
Figure 6:
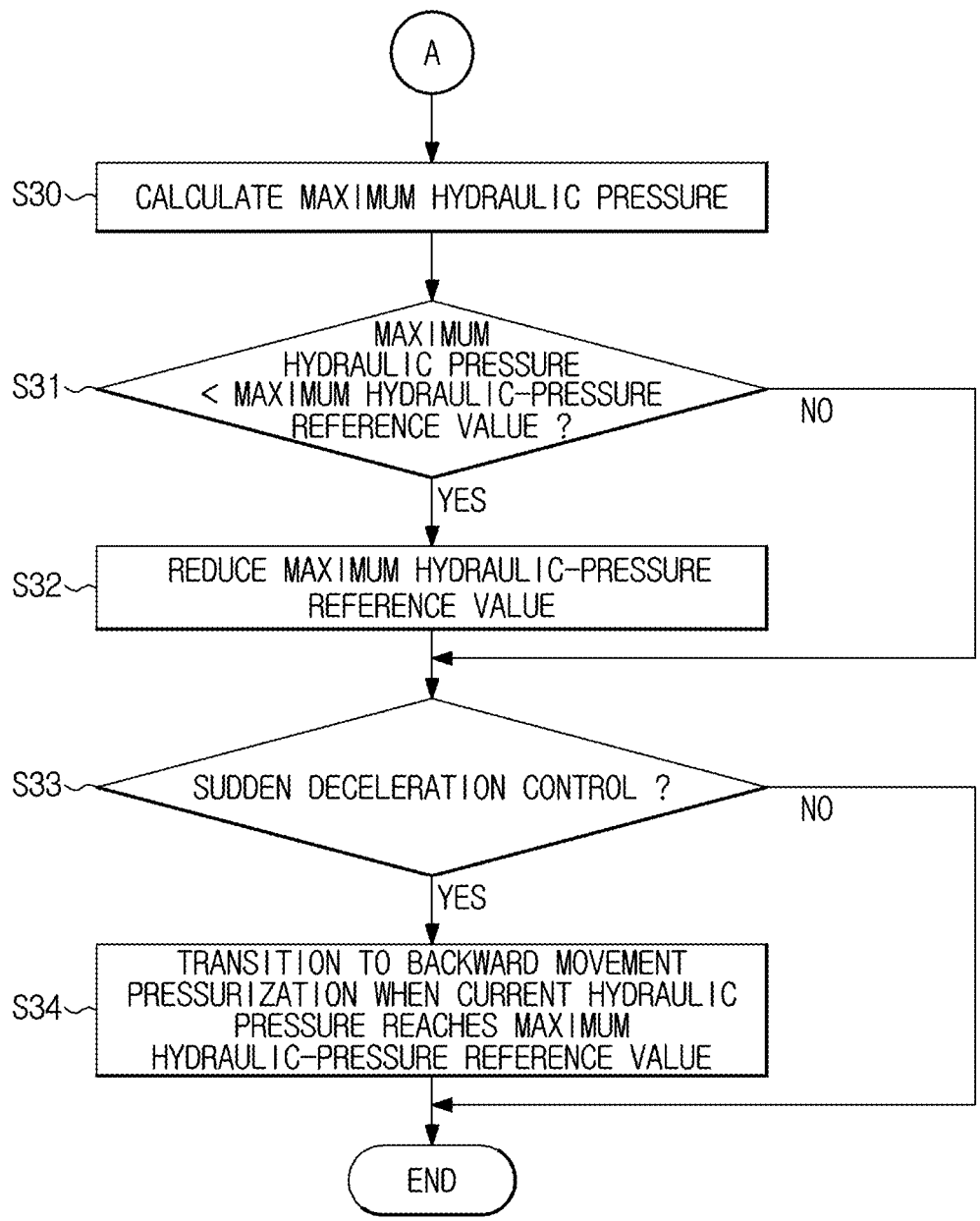
FIG. 6 is a flowchart illustrating a method for allowing a brake system to control pressurization for backward movement of a piston by referring to a corrected curve of the amount of consumed fluid to hydraulic pressure according to another embodiment of the present disclosure.

FIG. 5 is a graph illustrating curves of the amount of consumed fluid to hydraulic pressure depending on the amount of forward or backward movement of a piston. FIG. 6 is a flowchart illustrating a method for allowing a brake system to control pressurization for backward movement of a piston by referring to a corrected curve of the amount of consumed fluid to hydraulic pressure according to another embodiment of the present disclosure.

Referring to FIG. 5, as the piston moves farther forward, higher hydraulic pressure may occur. As the amount of such movement of the piston increases, the volume of brake fluid to be supplied to calipers may increase, and hydraulic pressure to be affected by a volume change of such brake fluid may also increase.

Meanwhile, the piston may move only up to a maximum limit value (dmax) due to mechanical characteristics thereof, such that hydraulic pressure may also increase only up to a maximum hydraulic pressure (Pmax).

Generally, if sudden deceleration control is needed, the processor may perform ABS control. If ABS control is performed, the piston may move forward and backward several times.

In this case, when the processor may determine that hydraulic pressure is equal to or higher than a maximum hydraulic-pressure reference value (Pmax1), and may determine that the piston has moved up to the maximum limit value (dmax), the processor may perform backward movement control of the piston. If temperature of brake fluid is at a high temperature, the consumed-fluid-amount/hydraulic-pressure curve becomes gentle in slope. As a result, although the piston moves forward up to the maximum limit value (dmax), the resultant hydraulic pressure may not exceed the maximum hydraulic-pressure reference value (Pmax1).

In other words, although the piston moves forward up to the maximum limit value (dmax) and the resultant hydraulic pressure reaches only the maximum hydraulic-pressure reference value (Pmax1), the processor begins to control backward movement of the piston.

As a result, the resultant hydraulic pressure may reach the maximum hydraulic pressure (Pmax) by execution of such backward movement control of the piston. Thus, when hydraulic pressure reaches the maximum hydraulic-pressure reference value (Pmax1) in a situation in which sudden deceleration control is needed, the piston may move backward for ABS control.

Referring to FIG. 6, the processor of the brake system 1 may correct the consumed-fluid-amount/hydraulic-pressure curve according to temperature of brake fluid as described above, may calculate a maximum hydraulic pressure (Phmax) of the piston corresponding to a maximum limit value (dmax) of the piston by referring to the corrected consumed-fluid-amount/hydraulic-pressure curve (S30), and may determine whether the calculated maximum hydraulic pressure (Phmax) is less than the maximum hydraulic-pressure reference value (Pmax1) (S31). If the calculated maximum hydraulic pressure (Phmax) is less than the maximum hydraulic-pressure reference value (Pmax1) (YES in S31), the maximum hydraulic-pressure reference value (Pmax1) may be reduced to another maximum hydraulic-pressure reference value (Pmax2) (S32).

The processor may determine whether sudden deceleration control is required (S33). Under the condition that sudden deceleration control is required (YES in S33), if hydraulic pressure reaches the lower maximum hydraulic-pressure reference value (Pmax2), the piston may move backward for ABS control (S34).

However, if the calculated maximum hydraulic pressure (Phmax) is equal to or higher than the maximum hydraulic-pressure reference value (Pmax1) (NO in S31), the consumed-fluid-amount/hydraulic-pressure curve may remain unchanged. Under the condition that sudden deceleration control is required (YES in S33), if hydraulic pressure reaches the maximum hydraulic-pressure reference value (Pmax1), the piston may move backward for ABS control (S34).

In order to determine whether sudden deceleration control is required, the processor may determine whether a time-variant change in output values of the pressure sensor 1200 is equal to or higher than a predetermined reference change, such that the processor may decide to perform such sudden deceleration control when the time-variant change is equal to or higher than the predetermined reference change.

Meanwhile, some constituent elements of the above-mentioned brake system 1 may refer to software components and/or hardware components such as Field Programmable Gate Array (FPGA) or Application Specific Integrated Circuit (ASIC).

The above-mentioned embodiments may be implemented in the form of a recording medium storing commands capable of being executed by a computer system. The commands may be stored in the form of program code. When the commands are executed by the processor, a program module is generated by the commands so that the operations of the disclosed embodiments may be carried out. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, etc.

The brake system and the method for controlling the same according to the embodiments of the present disclosure may determine when at least one piston begins to move backward by referring to temperature of brake fluid, resulting in smooth control of sudden deceleration control.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A brake system comprising:
   a piston configured to generate a hydraulic pressure of brake fluid stored in a brake system; and
   an electronic control unit (ECU) configured to calculate the hydraulic pressure to be generated in response to an amount of movement of the piston,
   wherein the electronic control unit (ECU) estimates a current temperature of the brake fluid, calculates a maximum estimated hydraulic pressure of the piston, which is generated when the piston is maximally moved in a forward direction, based on the estimated current temperature of the brake fluid, and calculates a maximum hydraulic-pressure reference value for controlling backward movement of the piston based on the maximum estimated hydraulic pressure calculated based on the estimated current temperature of the brake fluid.

2. The brake system according to claim 1, wherein the electronic control unit (ECU) corrects a first function based on the current temperature of the brake fluid, and calculates the maximum estimated hydraulic pressure of the piston having moved to a maximum limit value based on the corrected first function.

3. The brake system according to claim 2, wherein:
   when the maximum estimated hydraulic pressure is less than a pre-stored maximum hydraulic-pressure reference value, the electronic control unit (ECU) reduces the maximum hydraulic-pressure reference value.

4. The brake system according to claim 2, wherein the electronic control unit (ECU) corrects the first function in a manner that a change of the hydraulic pressure relative to a change of a volume of the brake fluid in the first function is inversely proportional to the temperature of the brake fluid.

5. The brake system according to claim 4, wherein:
   when the temperature of the brake fluid is equal to or higher than a predetermined high-temperature reference value, the electronic control unit (ECU) corrects the first function to a pre-stored second function; and
   when the temperature of the brake fluid is less than a predetermined low-temperature reference value, the electronic control unit (ECU) corrects the first function to a pre-stored third function.

6. The brake system according to claim 1, further comprising:
   a sensor module configured to measure the hydraulic pressure,
   wherein the electronic control unit (ECU) is configured to, when the hydraulic pressure measured by the sensor module reaches the maximum hydraulic-pressure reference value calculated based on the calculated maximum estimated hydraulic pressure in a situation in which sudden deceleration control is required, move the piston backward.

7. The brake system according to claim 1, wherein the electronic control unit (ECU) corrects, based on the current temperature of the brake fluid, a first function for calculating the estimated hydraulic pressure of the piston from a volume of the brake fluid, so that a change of the hydraulic pressure relative to a change of a volume of the brake fluid in the first function is changed to be inversely proportional to the temperature of the brake fluid.

8. A method for controlling a brake system in which a first function for calculating a hydraulic pressure to be generated in response to volume of brake fluid to be consumed in the brake system is pre-stored, the method comprising:
estimating a temperature of the brake fluid;
measuring the hydraulic pressure of the brake fluid;
calculating a maximum estimated hydraulic pressure of a piston, which is generated when the piston is maximally moved in a forward direction, based on the estimated temperature of the brake fluid;
calculating a maximum hydraulic-pressure reference value for controlling backward movement of the piston based on the maximum estimated hydraulic-pressure calculated based on the estimated temperature of the brake fluid; and
when the measured hydraulic pressure of the brake fluid reaches the calculated maximum hydraulic-pressure reference value in a situation in which sudden deceleration control is required, moving the piston backward.

9. The method according to claim 8, wherein the calculating the maximum estimated hydraulic pressure of the piston includes:
correcting the first function for calculating the hydraulic pressure based on the estimated temperature of the brake fluid; and
calculating an estimated hydraulic pressure based on the first function corrected based on the estimated temperature of the brake fluid,
wherein the calculating the estimated hydraulic pressure includes calculating an estimated hydraulic pressure at a certain point based on the first function corrected based on the estimated temperature of the brake fluid.

10. The method according to claim 9, wherein the correcting the first function for calculating the hydraulic pressure based on the estimated temperature of the fluid includes:
correcting the first function for calculating the hydraulic pressure in a manner that a change the hydraulic pressure relative to a change of a volume of the brake fluid in the first function is inversely proportional to the temperature of the brake fluid.

11. The method according to claim 10, wherein the correcting the first function for calculating the hydraulic pressure based on the estimated temperature of the brake fluid includes:
when the temperature of the brake fluid is equal to or higher than a predetermined high-temperature reference value, correcting the first function to a pre-stored second function; and
when the temperature of the brake fluid is less than a predetermined low-temperature reference value, correcting the first function to a pre-stored third function.

12. The method according to claim 8, wherein the calculating the maximum hydraulic-pressure reference value for controlling the backward movement of the piston based on the maximum estimated hydraulic pressure includes:
when the maximum estimated hydraulic pressure is less than a pre-stored maximum hydraulic-pressure reference value, reducing the maximum hydraulic-pressure reference value.

13. The method according to claim 8, further comprising correcting, based on the current temperature of the brake fluid, the first function for calculating the estimated hydraulic pressure of the piston from the volume of the brake fluid, so that a change of the hydraulic pressure relative to a change of a volume of the brake fluid in the first function is changed to be inversely proportional to the temperature of the brake fluid.

14. A brake system comprising:
a piston configured to generate a hydraulic pressure of brake fluid stored in a brake system; and
an electronic control unit (ECU) configured to calculate the hydraulic pressure to be generated in response to an amount of movement of the piston,
wherein the electronic control unit (ECU) is configured to:
estimate a current temperature of the brake fluid,
calculate a maximum estimated hydraulic pressure of the piston, which is generated when the piston is maximally moved in a forward direction, based on the estimated current temperature of the brake fluid,
calculate a maximum hydraulic-pressure reference value based on the maximum estimated hydraulic pressure and
move the piston in a backward direction based on an estimated hydraulic pressure, which is generated when the piston is moved in the forward direction, being equal to or greater than maximum hydraulic-pressure reference value.

15. The brake system according to claim 14, wherein the electronic control unit (ECU) corrects a first function based on the current temperature of the brake fluid, and calculates the maximum estimated hydraulic pressure of the piston having moved to a maximum limit value based on the corrected first function.

16. The brake system according to claim 15, wherein:
when the maximum estimated hydraulic pressure is less than a pre-stored maximum hydraulic-pressure reference value, the electronic control unit (ECU) reduces the maximum hydraulic-pressure reference value.

17. The brake system according to claim 15, wherein the electronic control unit (ECU) corrects the first function in a manner that a change of the hydraulic pressure relative to a change of a volume of the brake fluid in the first function is inversely proportional to the temperature of the brake fluid.

18. The brake system according to claim 17, wherein:
when the temperature of the brake fluid is equal to or higher than a predetermined high-temperature reference value, the electronic control unit (ECU) corrects the first function to a pre-stored second function; and
when the temperature of the brake fluid is less than a predetermined low-temperature reference value, the electronic control unit (ECU) corrects the first function to a pre-stored third function.

19. The brake system according to claim 14, further comprising:
a sensor module configured to measure the hydraulic pressure,
wherein the electronic control unit (ECU) is configured to, when the hydraulic pressure measured by the sensor module reaches the maximum hydraulic-pressure reference value calculated based on the calculated maximum estimated hydraulic pressure in a situation in which sudden deceleration control is required, move the piston in the backward direction.

* * * * *